(12) United States Patent
Lo

(10) Patent No.: US 8,385,034 B2
(45) Date of Patent: Feb. 26, 2013

(54) ELECTROSTATIC DISCHARGE PROTECTION CIRCUIT

(75) Inventor: Shin-Tai Lo, Miaoli (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 259 days.

(21) Appl. No.: 12/851,047

(22) Filed: Aug. 5, 2010

(65) Prior Publication Data

US 2011/0038084 A1 Feb. 17, 2011

(30) Foreign Application Priority Data

Aug. 12, 2009 (TW) ................................ 98127147 A

(51) Int. Cl.
*H02H 3/22* (2006.01)
(52) U.S. Cl. ........................................ 361/56; 361/111
(58) Field of Classification Search ............... 361/56, 361/111
See application file for complete search history.

(56) References Cited

U.S. PATENT DOCUMENTS

| 7,782,583 B2 * | 8/2010 | Moon ............................. 361/56 |
| 2006/0072260 A1 * | 4/2006 | Arakawa et al. ................. 361/56 |
| 2008/0197415 A1 * | 8/2008 | Yun ................................ 257/355 |

* cited by examiner

Primary Examiner — Danny Nguyen

(57) ABSTRACT

The invention discloses an electrostatic discharge protection circuit suitable for an integrated circuit system. The integrated circuit system includes a first power terminal, a second power terminal, an internal circuit and a reset signal wiring. The electrostatic discharge protection circuit includes a first transistor and a second transistor. The first transistor has a first gate, a first electrode and a second electrode. The first gate is coupled to the first power-source. The first electrode is electrically connected to the second power-source. The second transistor has a second gate, a third electrode and a fourth electrode, which are electrically connected to the second electrode, the first power-source and the reset signal wiring respectively. When the integrated circuit system is under an electrostatic discharge condition, the first and the second transistors are switched on, so as to equalize the voltage level of the reset signal wiring to the voltage level of the first power terminal.

14 Claims, 2 Drawing Sheets

ELECTROSTATIC DISCHARGE PROTECTION CIRCUIT

This application claims priority based on a Taiwanese Patent Application No. 098127147, filed on Aug. 12, 2009, the disclosure of which is incorporated herein by reference in its entirety.

BACKGROUND OF THE INVENTION

1. Field of the Invention

The invention relates to an electrostatic discharge protection circuit. More particularly, the invention relates to an electrostatic discharge protection circuit corresponding to a reset signal wiring.

2. Description of the Related Art

With the development of semiconductor technology, the integrated circuit imports some cutting-edged producing procedure. Therefore, the electronic product may have higher performance, smaller size, and lower power consumption. More and more circuit components are integrated into a compact system-on-chip (SoC) especially on some handheld electronic devices, e.g. mobile phone, digital camera, and personal digital assistant (PDA). Accordingly, the digital product with a tiny size may provide best performance.

In modern microelectronic circuits, the die size is shrinking with an exponential speed. Highly integrated electronic system nowadays is driven by some precise triggering signal, so as to perform some functions or judgment at a high frequency. However, the electronic system may be affected by the external or internal noise. For example, the electrostatic discharge (ESD) is one of the unstable factors in the microelectronic system. Unexpected ESD may cause malfunctions to some circuit components within the electronic system.

In general, there are two main effects of the ESD to the internal circuit. The first one is that a high discharging current may impact and damage the electron channel of the internal circuit during the electrostatic discharging. The other one is that the control signal wiring or input/output port of the IC may be interfered by the discharging current during the electrostatic discharging, and it may cause the system crash or malfunction.

In an integrated circuit chip, there are usually some important signal wirings, e.g. clock (CLK) wiring, enable (EN) wiring and reset (RST) wiring. For example, unexpected ESD may false-trigger the reset wiring in the chips, such that some working components or important references may be forced to reset accidentally. In this case, some function of the system may fail, or even the whole system may crash down. Sometimes, it needs to reboot the whole system or re-install firmware to repair the system. Therefore, the repair procedure may cost a lot of time and effort.

In order to prevent the ESD current from damaging the internal circuit, most electronic devices in prior art implement the ESD protection system. The ESD protection system is used for maintaining the reference voltage of the control signal wiring on a specific level, so as to prevent the false-triggering. However, the ESD protection system in prior art needs some specific circuit structure and firmware for operating and judging, so that the traditional ESD protection system is more complex. In other words, it needs both hardware and firmware working together for elevating the ESD protection capability.

The invention discloses an ESD protection circuit capable of detecting the electrostatic discharging, and it can maintain the level of the reset signal wiring when the electrostatic discharge is happening. In this way, the ESD protection circuit may avoid false-triggering on the reset signal wiring, so as to solve aforesaid problems.

SUMMARY OF THE INVENTION

A scope of the invention is to provide an electrostatic discharge protection circuit suitable for an integrated circuit system. The integrated circuit system includes a first power terminal, a second power terminal, an internal circuit and a reset signal wiring connected with the internal circuit. The internal circuit is coupled between the first power terminal and the second power terminal.

According to an embodiment, as shown in FIG. 2, the electrostatic discharge protection circuit 2 includes a first transistor SW2 and a second transistor SW1. The first transistor SW2 has a first gate 101, a first electrode 201 and a second electrode 202. The first gate 101 is connected or coupled to the first power terminal Vdd. The first electrode 201 is connected to the second power terminal Vss. The second transistor SW1 has a second gate 102, a third electrode 203 and a fourth electrode 204. The second gate 102 is connected to the second electrode 202. The third electrode 203 is connected the first power terminal Vdd. The fourth electrode 204 is connected to the reset signal wiring 22.

In this embodiment, when an electrostatic discharge condition occurs to the integrated circuit system, the first transistor and the second transistor are switched on, such that a level of the reset signal wiring is equalized to a level of the first power terminal via the second transistor.

Another scope of the invention is to provide an electrostatic discharge protection circuit suitable for an integrated circuit system. The integrated system includes an operational power terminal, a systemic ground terminal, an internal circuit and a reset signal wiring connected with the internal circuit. The internal circuit is coupled between the operational power terminal and the systemic ground terminal.

According to an embodiment, as shown in FIG. 2, the electrostatic discharge protection circuit 2 includes a first resistor-capacitor (RC) circuit 10, a second RC circuit 12, a P-channel metal-oxide-semiconductor (PMOS) transistor (SW1) and an N-channel metal-oxide-semiconductor (NMOS) transistor (SW2). The first RC circuit 10 is coupled between the operational power terminal Vdd and the systemic ground terminal Vss. The first RC circuit 10 includes a first resistor R1 coupled to the operational power terminal Vdd and a first capacitor C1 coupled to the systemic ground terminal Vss. The second RC circuit 12 is coupled between the operational power terminal Vdd and the systemic ground terminal Vss. The second RC circuit 12 includes a second resistor R2 coupled to the systemic ground terminal Vss and a second capacitor C2 coupled to the operational power terminal Vdd. The PMOS transistor (SW1) is coupled between the operational power terminal Vdd and the reset signal wiring 22 and having a first electrode (204) connected to the reset wiring 22. The PMOS transistor (SW1) has a first gate (102) coupled between the first resistor R1 and the first capacitor C1. The NMOS transistor (SW2) is coupled between the first gate (102) and the systemic ground terminal Vss and having a second electrode (202) connected to the first gate (102). The NMOS transistor (SW2) has a second gate (101) coupled between the second resistor R2 and the second capacitor C2.

In this embodiment, when an electrostatic discharge condition occurs to the integrated circuit system, the PMOS transistor and the NMOS transistor are triggered and switched on, such that a level of the reset signal wiring is equalized to a level of the operational power terminal via the PMOS transistor.

Another scope of the invention is to provide an electrostatic discharge protection circuit suitable for an integrated circuit system. The integrated system includes an operational power terminal, a systemic ground terminal, an internal circuit and a reset signal wiring connected with the internal circuit. The internal circuit is coupled between the operational power terminal and the systemic ground terminal.

According to an embodiment, as shown in FIG. 4, the electrostatic discharge protection circuit 4 includes a first RC circuit 30, a second RC circuit 32, a NMOS transistor SW3 and a PMOS transistor SW4. The first RC circuit 30 is coupled between the operational power terminal Vdd and the systemic ground terminal Vss. The first RC circuit 30 includes a first resistor R1 coupled to the operational power terminal Vdd and a first capacitor C1 coupled to the systemic ground terminal Vss. The second RC circuit 32 is coupled between the operational power terminal Vdd and the systemic ground terminal Vss. The second RC circuit 32 includes a second resistor R2 coupled to the systemic ground terminal Vss and a second capacitor C2 coupled to the operational power terminal Vdd. The NMOS transistor SW3 is coupled between the reset signal wiring 42 and the systemic ground terminal Vss. The NMOS transistor SW3 has a first gate 101 coupled between the second resistor R2 and the second capacitor C2 and having a first electrode 201 connected to the reset wiring 42. The PMOS transistor SW4 is coupled between the first gate 101 and the operational power terminal Vdd and having a second electrode 202 connected to the first gate 101. The PMOS transistor SW4 has a second gate 102 coupled between the first capacitor C1 and the first resistor R1.

In this embodiment, when an electrostatic discharge condition occurs to the integrated circuit system, the PMOS transistor and the NMOS transistor are triggered and switched on, such that a level of the reset signal wiring is equalized to a level of the systemic ground terminal via the NMOS transistor.

Compared to the traditional ESD protection circuit which needs specific firmware and hardware for elevating the ESD tolerance, the ESD protection circuit of the invention may utilize a simple circuit structure for detecting the happening ESD according to the charging/discharging characteristic of RC circuits and transistor switches. The ESD protection circuit may further maintain the voltage level of the reset signal wiring at a certain level in a specific time period, such that the ESD condition will not cause the mal-function to the internal circuit. In this case, the ESD protection circuit of the invention may utilize a simple circuit structure to elevate the stability of whole electronic system.

The advantage and spirit of the invention may be understood by the following recitations together with the appended drawings.

DETAILED DESCRIPTION OF THE PREFERRED EMBODIMENT

Figure 1:
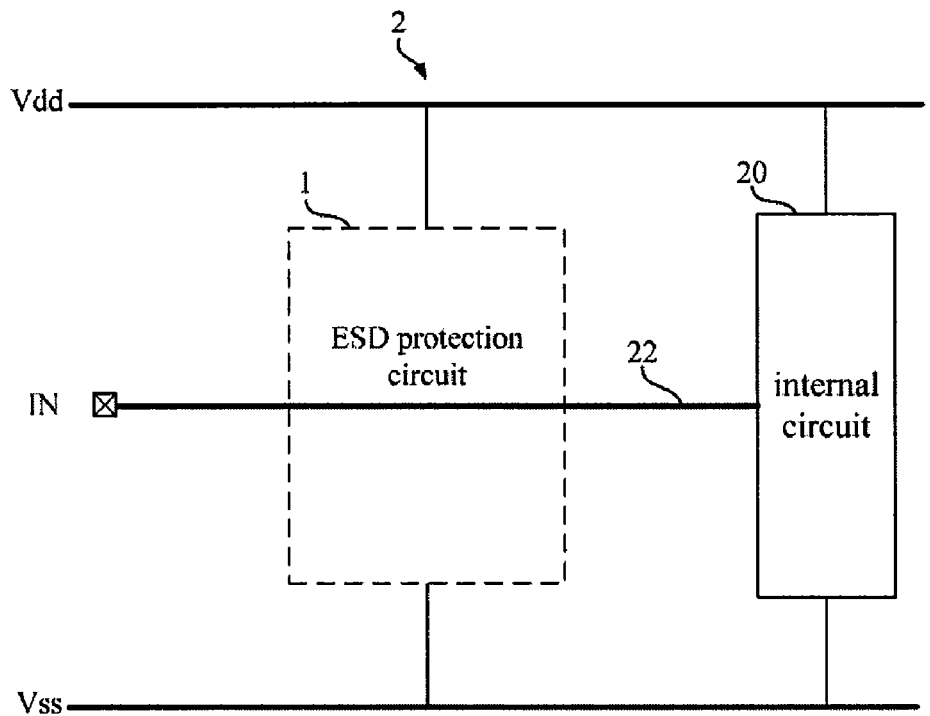
FIG. 1 is a schematic diagram illustrating an electrostatic discharge (ESD) protection circuit and an integrated circuit system according to a first embodiment of the invention.

Please refer to FIG. 1. FIG. 1 is a schematic diagram illustrating an electrostatic discharge (ESD) protection circuit 1 and an integrated circuit system 2 according to a first embodiment of the invention. As shown in FIG. 1, the integrated circuit system 2 may include two power terminals, an internal 20 and a reset signal wiring connected with the internal circuit 20. In this embodiment, two power terminals are the operational power terminal Vdd and the systemic ground terminal Vss of the integrated circuit system 2, but the invention is not limited to this. The internal circuit 20 is coupled between these two power terminals (the operational power terminal Vdd and the systemic ground terminal Vss). The internal circuit 20 may gain necessary power supply from the operational power terminal Vdd and the systemic ground terminal Vss.

Besides, the integrated circuit system 2 shown in FIG. 1 may further include an input pad IN. The reset signal wiring 22 is electrically connected between the input pad IN and the internal circuit 20. The reset signal wiring 22 is responsible for transmitting a control signal used for resetting the internal circuit 20. In this embodiment, the control signal transmitted through the reset signal wiring 22 can be a negative logic reset signal (RSTN). When RSTN is at low voltage level, the internal circuit 20 is triggered to reset itself; on the other hand, when RSTN is at high voltage level, the internal circuit 20 operates normally. In other words, the RSTN should be maintained at high voltage level in default, so as to keep the internal circuit 20 operating normally.

However, when the electrostatic discharge occurs, there will be a temporary and unpredictable change on the voltage level between the operational power terminal Vdd and the systemic ground terminal Vss. In this invention, the electrostatic discharge circuit 1 is used for preventing the electrostatic discharge and making sure that the reset signal wiring 22 between the input pad IN and the systemic ground terminal Vss is free from the negative effect of the electrostatic discharge.

Figure 2:
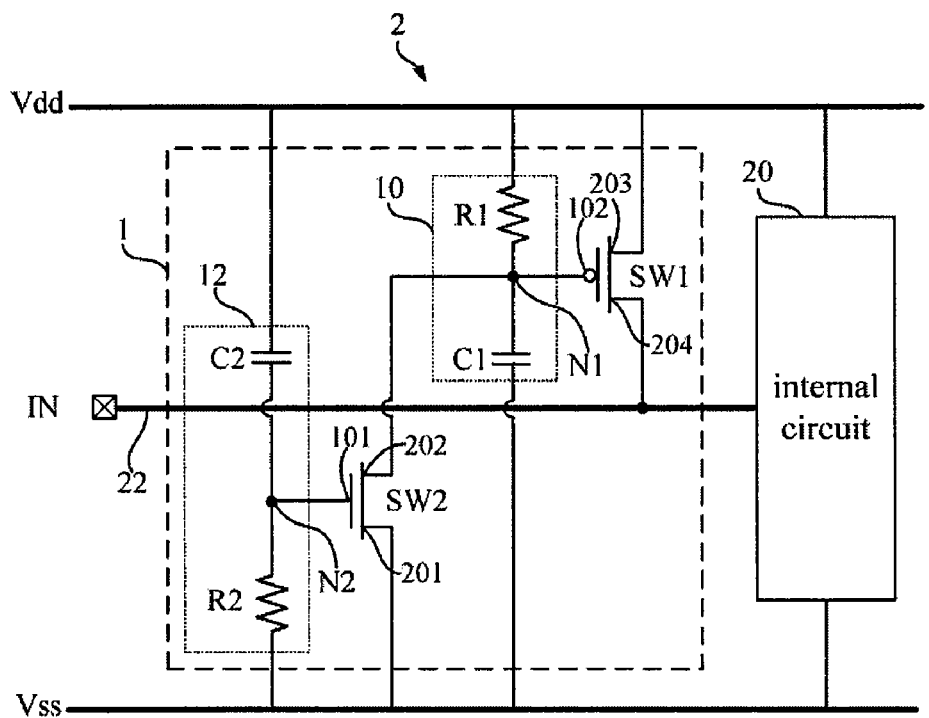
FIG. 2 is a circuit schematic diagram illustrating the ESD protection circuit in FIG. 1.

Please refer to FIG. 2. FIG. 2 is a circuit schematic diagram illustrating the ESD protection circuit 1 in FIG. 1. In this embodiment, the ESD protection circuit 1 includes a first RC circuit 10, a second RC circuit 12 and two transistor switch components. In this embodiment, these two transistor switch components are a P-channel metal-oxide-semiconductor (PMOS) transistor SW1 and an N-channel metal-oxide-semiconductor (NMOS) transistor SW2, but the invention is not limited to this.

As shown in FIG. 2, the first RC circuit 10 is coupled between the operational power terminal Vdd and the systemic ground terminal Vss. The first RC circuit 10 includes a first resistor R1 and a first capacitor C1. The first resistor R1 is coupled to the operational power terminal Vdd and the first capacitor C1 is coupled to the systemic ground terminal Vss. A product of a first resistance value of the first resistor R1 and a first capacitance value of the first capacitor C1 is a first time constant of the first RC circuit 10. The value of the first time constant corresponds to the charging/discharging speed and period of the first RC circuit 10.

The second RC circuit 12 is coupled between the operational power terminal Vdd and the systemic ground terminal Vss. The second RC circuit 12 includes a second resistor R2 and a second capacitor C2. The second resistor R2 is coupled to the systemic ground terminal Vss and the second capacitor C2 is coupled to the operational power terminal Vdd. A product of a second resistance value of the second resistor R2 and a second capacitance value of the second capacitor C2 is a second time constant. The value of the second time constant corresponds to the charging/discharging speed and period of the second RC circuit 12.

The PMOS transistor SW1 is coupled between the operational power terminal Vdd and the reset signal wiring 22. A gate of the PMOS transistor SW1 is coupled to a node (i.e. the first node N1 shown in FIG. 2) between the first resistor R1 and the first capacitor C1. The switch state of the PMOS transistor SW1 is controlled by the charging/discharging condition of the first RC circuit 10. More particularly, it is turned on or turned off according to the voltage level on the first node N1.

The NMOS transistor SW2 is coupled between the gate of the PMOS transistor SW1 and the systemic ground terminal Vss. A gate of the NMOS transistor SW2 is coupled to a node (i.e. the second node N2 shown in FIG. 2) between the second resistor R2 and the second capacitor C2. The switch state of the NMOS transistor SW2 is controlled by the charging/discharging condition of the second RC circuit 12. More particularly, it is turned on or turned off according to the voltage level on the second node N2.

When an electrostatic discharge condition occurs to the integrated circuit system 2, the operational power terminal Vdd and the systemic ground terminal Vss may be affected by the transient voltage or transient current from the electrostatic discharge condition, such that the voltage difference between the operational power terminal Vdd and the systemic ground terminal Vss may be enlarged. In practical applications, the voltage difference may be enlarged because of a boosted operational power terminal Vdd or a dropped systemic ground terminal Vss. At the time that the electrostatic discharge condition occurs, the Vgs (i.e. voltage difference between gate electrode and the source electrode) of the PMOS transistor SW1 and the Vgs of the NMOS transistor SW2 are both enlarged, such that the PMOS transistor SW1 and the NMOS transistor SW2 are triggered to be switched on. Accordingly, the reset signal wiring 22 is conducted to the operational power terminal Vdd through the switched-on PMOS transistor SW1, and then a level of the reset signal wiring 22 is equalized to a level of the operational power terminal Vdd.

In other words, at the time that the electrostatic discharge condition occurs, the PMOS transistor SW1 and the NMOS transistor SW2 are both switched on, and the reset signal wiring 22 are temporarily kept at high voltage level (equal to the level of the operational power terminal Vdd). Therefore, the level of the reset signal wiring 22 will not drop to low voltage level in a sudden, so as to prevent from forming a negative reset signal on the reset signal wiring 22 and false-triggering the reset function of the internal circuit 20.

Besides, after the second time constant of the second RC circuit 12 from the beginning of the electrostatic discharge condition, the NMOS transistor will be shut down because that the voltage level of the second node N2 in the second RC circuit 12 is gradually decreasing (due to the second RC circuit 12 is discharging through the second resistor R2). Finally, the Vgs of the NMOS transistor SW2 will be lower than its threshold voltage and then the NMOS transistor SW2 will be shut down.

When the NMOS transistor is shut down, the operational power terminal Vdd begins to charge the first capacitor C1 via the first resistor R1. Accordingly, the voltage level of the first N1 will rise gradually, and then the PMOS transistor SW1 will be shut down after the first time constant (when the Vgs of the PMOS transistor SW1 is lower than its threshold voltage).

To be noticed that, since that the electrostatic discharge condition occurs and the PMOS transistor SW1 and the NMOS transistor SW2 are triggered to be switched on to that the PMOS transistor SW1 returns to shut-down state, the level of the reset signal wiring 22 is maintained at a fixed value, which is equalized to the level of the operational power terminal Vdd.

In this embodiment, at least one or both of the first time constant of the first RC circuit 10 and the second time constant of the second RC circuit 12 can be designed to exceed the possible ESD condition prolonging time of the integrated circuit system 2. In this case, the stability of the reset signal wiring 22 under the ESD condition can be ensured.

Figure 3:
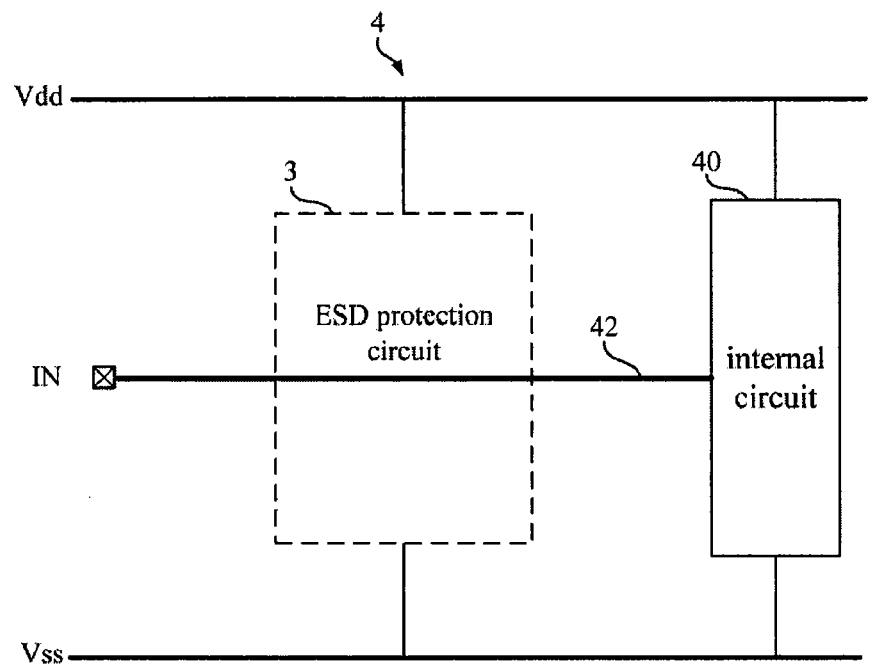
FIG. 3 is a schematic diagram illustrating an electrostatic discharge protection circuit and an integrated circuit system according to a second embodiment of the invention.
Figure 4:
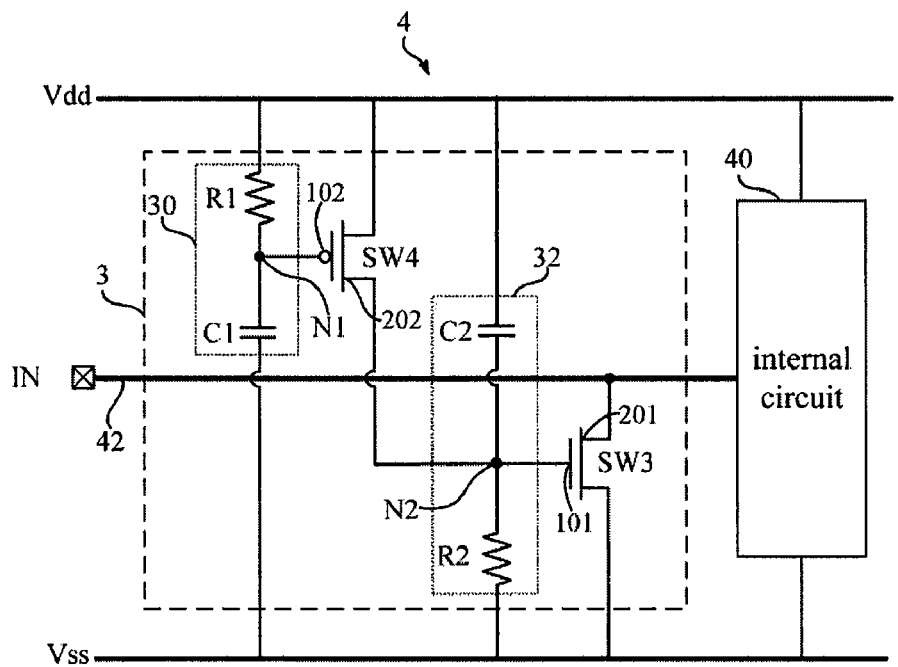
FIG. 4 is a circuit schematic diagram illustrating the ESD protection circuit in FIG. 3.

In aforesaid first embodiment, the ESD protection circuit 1 may correspond to the negative-logic reset signal wiring 22, but the invention is not limited to this. Please refer to FIG. 3 and FIG. 4. FIG. 3 is a schematic diagram illustrating an electrostatic discharge protection circuit 3 and an integrated circuit system 4 according to a second embodiment of the invention. FIG. 4 is a circuit schematic diagram illustrating the ESD protection circuit 3 in FIG. 3.

Compared to aforesaid first embodiment, the main difference is that the reset signal wiring 42 in the second embodiment is used for transmitting a positive-logic reset signal (RST). The positive-logic reset signal means that the internal circuit 40 will be reset when the positive-logic reset signal is at high voltage level; on the other hand, the internal circuit 40 will operate normally when the positive-logic reset signal is at low voltage level or ground. In other words, the reset signal wiring 42 should be maintained at low voltage level in default situation, so as to keep the internal circuit 40 working properly.

In this invention, the electrostatic discharge circuit 3 disposed within an integrated circuit system 4 is used for keeping the voltage level of reset signal wiring 42 stable at low voltage level during the electrostatic discharge period.

As shown in FIG. 4, the ESD protection circuit 3 includes a first RC circuit 30, a second RC circuit 32 and two transistor switch components. In this embodiment, these two transistor switch components can be a NMOS transistor SW3 and a PMOS transistor SW4.

The first RC circuit 30 is coupled between the operational power terminal Vdd and the systemic ground terminal Vss. The first RC circuit 30 includes a first resistor R1 and a first capacitor C1. The first resistor R1 is coupled to the operational power terminal Vdd and the first capacitor C1 is coupled to the systemic ground terminal Vss.

The second RC circuit 32 is coupled between the operational power terminal Vdd and the systemic ground terminal Vss. The second RC circuit 32 includes a second resistor R2 and a second capacitor C2. The second resistor R2 is coupled to the systemic ground terminal Vss and the second capacitor C2 is coupled to the operational power terminal Vdd.

The NMOS transistor SW3 is coupled between the reset signal wiring 42 and the systemic ground terminal Vss. A gate of the NMOS transistor SW3 is coupled to a node (i.e. the second node N2 shown in FIG. 4) between the second resistor R2 and the second capacitor C2.

The PMOS transistor SW4 is coupled between the gate of the NMOS transistor SW3 and the operational power terminal Vdd. A gate of the PMOS transistor SW4 is coupled to a node (i.e. the first node N1 shown in FIG. 4) between the first resistor R1 and the first capacitor C1.

When an electrostatic discharge condition occurs to the integrated circuit system 4, the NMOS transistor SW3 and the PMOS transistor SW4 are triggered to be switched on.

Accordingly, a level of the reset signal wiring 42 is equalized to a level of the systemic ground terminal Vss via the NMOS transistor SW3.

Then, the voltage level on the first node N1 will rise gradually because of the charging from the first RC circuit 30. After a first time constant of the first RC circuit 30 or when the Vgs of the PMOS transistor SW4 is lower than its threshold voltage, the PMOS transistor SW4 will return to the shut-down state.

Afterward, the voltage level on the second node N2 will descend gradually because of the discharging from the second RC circuit 32. After a second time constant of the second RC circuit 32 or when the Vgs of the NMOS transistor SW3 is lower than its threshold voltage, the NMOS transistor SW3 will return to the shut-down state, such that the integrated circuit system 4 is restored to normal working state. The function and action of the ESD protection circuit 3 in the second embodiment is substantially similar to the first embodiment. Please refer to the first embodiment for further details.

In this case, the first time constant of the first RC circuit 30 and the second time constant of the second RC circuit 32 can be adjusted properly to ensure that the reset signal wiring 42 is stable at low voltage level during the ESD discharging period, so at to prevent the false-triggering.

In summary, the ESD protection circuit of the invention may utilize a simple circuit structure for detecting the happening ESD according to the charging/discharging characteristic of RC circuits and transistor switches. The ESD protection circuit may further maintain the voltage level of the reset signal wiring at a certain level in a specific time period, such that the ESD condition will not cause the mal-function to the internal circuit. In this case, the ESD protection circuit of the invention may utilize a simple circuit structure to elevate the stability of whole electronic system.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electrostatic discharge protection circuit, suitable for an integrated circuit system, the integrated system comprising a first power terminal, a second power terminal, an internal circuit and a reset signal wiring connected with the internal circuit, the electrostatic discharge protection circuit comprising:
    a first transistor having a first gate, a first electrode and a second electrode, the first gate being coupled to the first power terminal, and the first electrode being connected to the second power terminal;
    a second transistor having a second gate, a third electrode and a fourth electrode, the second gate being connected to the second electrode, the third electrode being connected the first power terminal, and the fourth electrode being connected to the reset signal wiring;
    a first resistor-capacitor (RC) circuit having a first resistor coupled to the first power terminal and a first capacitor coupled to the second power terminal; wherein a node is coupled between the first resistor and the first capacitor, and the node is coupled between the second gate and the second electrode; and
    a second resistor-capacitor (RC) circuit having a second capacitor coupled to the first power terminal and a second resistor coupled to the second power terminal, wherein the first gate is coupled between the second resistor and the second capacitor;
    wherein when an electrostatic discharge condition occurs to the integrated circuit system, the first transistor and the second transistor are switched on, such that a level of the reset signal wiring is equalized to a level of the first power terminal via the second transistor.

2. The electrostatic discharge protection circuit of claim 1, wherein the first power terminal is an operational power terminal of the internal circuit, and the second power terminal is a systemic ground terminal.

3. The electrostatic discharge protection circuit of claim 2, wherein the first transistor is an N-channel metal-oxide-semiconductor (NMOS) transistor and the second transistor is a P-channel metal-oxide-semiconductor (PMOS) transistor.

4. The electrostatic discharge protection circuit of claim 1, wherein the first power terminal is a systemic ground terminal, and the second power terminal is an operational power terminal of the internal circuit.

5. The electrostatic discharge protection circuit of claim 4, wherein the first transistor is a PMOS transistor and the second transistor is a NMOS transistor.

6. The electrostatic discharge protection circuit of claim 1, wherein the first RC circuit has a first time constant, the second RC circuit has a second time constant, and the first time constant and the second time constant are both longer than a electrostatic discharge time.

7. An electrostatic discharge protection circuit, suitable for an integrated circuit system, the integrated system comprising an operational power terminal, a systemic ground terminal, an internal circuit and a reset signal wiring connected with the internal circuit, the internal circuit being coupled between the operational power terminal and the systemic ground terminal, the electrostatic discharge protection circuit comprising:
    a first RC circuit coupled between the operational power terminal and the systemic ground terminal, the first RC circuit comprising a first resistor coupled to the operational power terminal and a first capacitor coupled to the systemic ground terminal;
    a second RC circuit coupled between the operational power terminal and the systemic ground terminal, the second RC circuit comprising a second resistor coupled to the systemic ground terminal and a second capacitor coupled to the operational power terminal;
    a PMOS transistor coupled between the operational power terminal and the reset signal wiring and having a first electrode connected to the reset wiring, the PMOS transistor having a first gate coupled between the first resistor and the first capacitor; and
    a NMOS transistor coupled between the first gate and the systemic ground terminal and having a second electrode connected to the first gate, the NMOS transistor having a second gate coupled between the second resistor and the second capacitor;
    wherein when an electrostatic discharge condition occurs to the integrated circuit system, the PMOS transistor and the NMOS transistor are triggered and switched on, such that a level of the reset signal wiring is equalized to a level of the operational power terminal via the PMOS transistor.

8. The electrostatic discharge protection circuit of claim 7, wherein a product of a first resistance value of the first resistor and a first capacitance value of the first capacitor is a first time constant, a product of a second resistance value of the second resistor and a second capacitance value of the second capacitor is a second time constant, and the first time constant and the second time constant are both longer than a electrostatic discharge time.

9. The electrostatic discharge protection circuit of claim 8, wherein after the second time constant from a beginning of the electrostatic discharge condition, the NMOS transistor is shut down.

10. The electrostatic discharge protection circuit of claim 9, wherein when the NMOS transistor is shut down, the operational power terminal charges the first capacitor via the first resistor, and then the PMOS transistor is shut down after the first time constant.

11. An electrostatic discharge protection circuit, suitable for an integrated circuit system, the integrated system comprising an operational power terminal, a systemic ground terminal, an internal circuit and a reset signal wiring connected with the internal circuit, the internal circuit being coupled between the operational power terminal and the systemic ground terminal, the electrostatic discharge protection circuit comprising:
- a first RC circuit coupled between the operational power terminal and the systemic ground terminal, the first RC circuit comprising a first resistor coupled to the operational power terminal and a first capacitor coupled to the systemic ground terminal;
- a second RC circuit coupled between the operational power terminal and the systemic ground terminal, the second RC circuit comprising a second resistor coupled to the systemic ground terminal and a second capacitor coupled to the operational power terminal;
- a NMOS transistor coupled between the reset signal wiring and the systemic ground terminal and having a first electrode connected to the reset wiring, the NMOS transistor having a first gate coupled between the second resistor and the second capacitor; and
- a PMOS transistor coupled between the first gate and the operational power terminal and having a second electrode connected to the first gate, the PMOS transistor having a second gate coupled between the first capacitor and the first resistor;

wherein when an electrostatic discharge condition occurs to the integrated circuit system, the PMOS transistor and the NMOS transistor are triggered and switched on, such that a level of the reset signal wiring is equalized to a level of the operational power terminal via the PMOS transistor.

12. The electrostatic discharge protection circuit of claim 11, wherein a product of a first resistance value of the first resistor and a first capacitance value of the first capacitor is a first time constant, a product of a second resistance value of the second resistor and a second capacitance value of the second capacitor is a second time constant, and the first time constant and the second time constant are both longer than a electrostatic discharge time.

13. The electrostatic discharge protection circuit of claim 12, wherein after the first time constant from a beginning of the electrostatic discharge condition, the PMOS transistor is shut down.

14. The electrostatic discharge protection circuit of claim 13, wherein when the PMOS transistor is shut down, the systemic ground terminal charges the second capacitor via the second resistor, and then the NMOS transistor is shut down after the second time constant.

* * * * *